United States Patent
Liu et al.

(10) Patent No.: US 12,363,791 B2
(45) Date of Patent: Jul. 15, 2025

(54) METHOD AND DEVICE TO ALLOCATE SIDELINK RESOURCES TO USER EQUIPMENT

(71) Applicant: VIVO MOBILE COMMUNICATION CO., LTD., Dongguan (CN)

(72) Inventors: Siqi Liu, Dongguan (CN); Zichao Ji, Dongguan (CN); Wei Bao, Dongguan (CN); Xiaodong Yang, Dongguan (CN); Shixiao Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 406 days.

(21) Appl. No.: 17/889,341

(22) Filed: Aug. 16, 2022

(65) Prior Publication Data

US 2022/0394813 A1 Dec. 8, 2022

Related U.S. Application Data (63) Continuation of application No. PCT/CN2021/077246, filed on Feb. 22, 2021.

(30) Foreign Application Priority Data

Feb. 21, 2020 (CN) .......................... 202010109220.3

(51) Int. Cl.
*H04W 76/28* (2018.01)
*H04W 72/23* (2023.01)
*H04W 92/18* (2009.01)

(52) U.S. Cl.
CPC ............ *H04W 76/28* (2018.02); *H04W 72/23* (2023.01); *H04W 92/18* (2013.01)

(58) Field of Classification Search
CPC ..... H04W 76/28; H04W 72/23; H04W 92/18; H04W 36/0083; H04W 52/02;
(Continued)

(56) References Cited

U.S. PATENT DOCUMENTS 9,998,971 B2 * 6/2018 Koc ....................... H04W 28/04
2009/0168731 A1 7/2009 Zhang et al.
(Continued)

FOREIGN PATENT DOCUMENTS

| CN | 101541090 A | 9/2009 |
|---|---|---|
| CN | 105723779 A | 6/2016 |

(Continued)

OTHER PUBLICATIONS

International Search Report issued in corresponding International Application No. PCT/CN2021/077246, mailed May 11, 2021, 4 pages.
(Continued)

*Primary Examiner* — Mewale A Ambaye
(74) *Attorney, Agent, or Firm* — IPX PLLC (57) ABSTRACT

A method for information reporting, user equipment, and a network side device are provided. The method includes: reporting target discontinuous transmission or reception information of at least one carrier to a target device, where the target discontinuous transmission or reception information is used to indicate discontinuous transmission or reception information of a target discontinuous transmission or reception mode of second UE; the target discontinuous transmission or reception mode includes at least one of the following: a first Uu discontinuous transmission or reception mode, a second Uu discontinuous transmission or reception mode, or a sidelink discontinuous transmission or reception mode, where the second Uu discontinuous transmission or reception mode is a Uu discontinuous transmission or reception mode used by UE with a first sidelink resource allocation mode.

19 Claims, 3 Drawing Sheets

(58) Field of Classification Search
CPC ..... H04W 76/14; H04W 76/23; H04W 24/10; H04W 5/00; H04W 72/25
See application file for complete search history.

(56) References Cited

U.S. PATENT DOCUMENTS

| | | | |
|---|---|---|---|
| 2018/0124864 A1 | 5/2018 | Lee et al. | |
| 2023/0354425 A1* | 11/2023 | Jeon | H04L 5/0048 |
| 2024/0098519 A1* | 3/2024 | Dutta | H04W 16/28 |
| 2024/0147437 A1* | 5/2024 | Hui | H04W 72/563 |

FOREIGN PATENT DOCUMENTS

| | | | |
|---|---|---|---|
| CN | 107241786 | * | 10/2017 |
| CN | 107241786 A | | 10/2017 |
| CN | 107787034 A | | 3/2018 |
| CN | 108200639 A | | 6/2018 |
| CN | 109891987 A | | 6/2019 |

OTHER PUBLICATIONS

Sequans Communications, "Power Efficient Relay Discovery Maintenance and Establishment", 3GPP TSG-RAN WG2 Meeting #97 R2-1701648, Feb. 3, 2017.

First Office Action issued in related Chinese Application No. 202010109220.3, mailed Jul. 27, 2022, 10 pages.

* cited by examiner

METHOD AND DEVICE TO ALLOCATE SIDELINK RESOURCES TO USER EQUIPMENT

CROSS-REFERENCE TO RELATED APPLICATIONS

This application is a continuation of International Application No. PCT/CN2021/077246, filed Feb. 22, 2021, which claims priority to Chinese Patent Application No. 202010109220.3, filed Feb. 21, 2020. The entire contents of each of the above-referenced applications are expressly incorporated herein by reference.

TECHNICAL FIELD

The present disclosure relates to the field of communication technologies, and in particular, to an information reporting method, user equipment, and a network side device.

BACKGROUND

In a Uu Discontinuous Reception (DRX) mode, in addition to configuring an active time, User Equipment (UE) may dynamically adjust a state (for example, an active state or an inactive state) of the UE based on received scheduling signaling or obtained grant, so as to enable or disable monitoring on a Physical downlink control channel (PDCCH).

However, since a sidelink DRX mode is performed on a sidelink, in addition to scheduling signaling or sidelink grant sent by the network side device, the UE may also dynamically adjust the state thereof in the sidelink DRX mode based on Sidelink Control Information (SCI) on the sidelink or HARQ-ACK information on a physical sidelink feedback channel (PSFCH). As a result, the network side device cannot exactly learn whether the UE is in the active state or the inactive state. In addition, when sidelink transmission is performed between UE and UE, since the two UEs may be within and outside network coverage of the network side device respectively, the UE within the network coverage may dynamically adjust a state thereof based on signaling sent by the network side device. As a result, the UE outside the network coverage cannot exactly learn whether the UE within the network coverage is in the active state or the inactive state.

In this way, when the network side device schedules the UE during the non-active time of the UE, or other UE performs transmission or reception during the non-active time of the UE, the user may not be able to receive a corresponding scheduling signaling, resulting in waste of resources or packet loss. Therefore, sidelink service performance is degraded.

SUMMARY

Embodiments of the present disclosure provide an information reporting method, user equipment, and a network side device, so as to solve the problem in the related art that when the network side device schedules the UE during a non-active time of the UE, or another UE performs transmission or reception during the non-active time of the UE, the service performance of the UE is degraded.

To resolve the foregoing technical problem, the present disclosure is implemented as follows:

According to a first aspect, an embodiment of the present disclosure provides an information reporting method, where the method is performed by first UE and includes: reporting target discontinuous transmission or reception information of at least one carrier to a target device, where the target discontinuous transmission or reception information is used to indicate a target discontinuous transmission or reception mode of second UE; the target discontinuous transmission or reception mode includes at least one of the following: a first Uu discontinuous transmission or reception mode, a second Uu discontinuous transmission or reception mode, and a sidelink discontinuous transmission or reception mode; and the second Uu discontinuous transmission or reception mode is a Uu discontinuous transmission or reception mode used by UE with a first sidelink resource allocation mode.

According to a second aspect, an embodiment of the present disclosure provides an information reporting method, where the method is performed by a network side device and includes:

sending indication information to first UE, where the indication information is used to instruct the first UE to report target discontinuous transmission or reception information of at least one carrier to the network side device; the target discontinuous transmission or reception information is used to indicate a target discontinuous transmission or reception mode of second UE; the target discontinuous transmission or reception mode includes at least one of the following: a first Uu discontinuous transmission or reception mode, a second Uu discontinuous transmission or reception mode, and a sidelink discontinuous transmission or reception mode; and the second Uu discontinuous transmission or reception mode is a Uu discontinuous transmission or reception mode used by UE with a first sidelink resource allocation mode.

According to a third aspect, an embodiment of the present disclosure provides UE, where the UE is first UE, and the first UE includes:

a reporting module, configured to report target discontinuous transmission or reception information of at least one carrier to a target device, where the target discontinuous transmission or reception information is used to indicate a target discontinuous transmission or reception mode of second UE; the target discontinuous transmission or reception mode includes at least one of the following: a first Uu discontinuous transmission or reception mode, a second Uu discontinuous transmission or reception mode, and a sidelink discontinuous transmission or reception mode; and the second Uu discontinuous transmission or reception mode is a Uu discontinuous transmission or reception mode used by UE with a first sidelink resource allocation mode.

According to a fourth aspect, an embodiment of the present disclosure provides a network side device, including:

a sending module, configured to send indication information to first UE, where the indication information is used to instruct the first UE to report target discontinuous transmission or reception information of at least one carrier to the network side device; the target discontinuous transmission or reception information is used to indicate a target discontinuous transmission or reception mode of second UE; the target discontinuous transmission or reception mode includes at least one of the following: a first Uu discontinuous transmission or reception mode, a second Uu discontinuous transmission or reception mode, and a sidelink discontinuous transmission or reception mode; and the second Uu discontinuous transmission or reception mode is a Uu discontinuous transmission or reception mode used by UE with a first sidelink resource allocation mode.

According to a fifth aspect, an embodiment of the present disclosure provides UE, where the UE is first UE, and the first UE includes a processor, a memory, and a computer program stored in the memory and executable on the processor, and when the computer program is executed by the processor, steps of the information reporting method provided in the first aspect are implemented.

According to a sixth aspect, an embodiment of the present disclosure provides a network side device, including a processor, a memory, and a computer program stored in the memory and executable on the processor, and when the computer program is executed by the processor, steps of the information reporting method provided in the second aspect are implemented.

According to a seventh aspect, an embodiment of the present disclosure provides a computer-readable storage medium, where the computer-readable storage medium stores a computer program, and when the computer program is executed by a processor, steps of the foregoing information reporting method are implemented.

In the embodiments of the present disclosure, the first UE reports the target discontinuous transmission or reception information of the at least one carrier to the target device, so that the target device may learn the discontinuous transmission or reception information of the first UE of the target discontinuous transmission or reception mode (including at least one of the following: a first Uu discontinuous transmission or reception mode, a second Uu discontinuous transmission or reception mode, and a sidelink discontinuous transmission or reception mode, where the second Uu discontinuous transmission or reception mode is a Uu discontinuous transmission or reception mode used by UE with a first sidelink resource allocation mode). Further, the target device may learn a discontinuous transmission state (an active state or an inactive state) of the second UE. In this way, it is ensured that the target device has a consistent understanding with the second UE, so that appropriate sidelink resources can be allocated to the second UE, and the reliability of a sidelink service is improved.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The following describes technical terms used in the embodiments of the present disclosure.

1. Discontinuous Transmission

The "discontinuous transmission" in the embodiments of the present disclosure includes discontinuous reception and/or discontinuous transmission. The discontinuous reception refers to "DRX" in the related art.

As for the "DRX" in the related art, a DRX mechanism is introduced in both Long Term Evolution (LTE) and NR, and an active time and a non-active time are configured for the DRX to save power for UE. Generally, an on duration (operating time) period is within the active time of the DRX. If there is no scheduling, the UE may enter a non-active time of a DRX cycle after the on duration period. Parameters such as onDurationTimer, drx-InactivityTimer, drx-RetransmissionTimer, and longDRX-CycleStartOffset are usually configured in configuring the DRX.

After the UE is configured with the DRX, if decoding of data sent or received fails, the UE needs to enter the active time to monitor the control channel and wait for retransmission scheduled by the network. During the On Duration period, if the UE is scheduled to receive or send data in a specific slot, the UE is likely to continue to be scheduled in next several slots. Therefore, a timer drx-InactivityTimer is started or restarted whenever the UE is scheduled to initially transmit data, and the UE will remain in an active state until the timer expires.

As for downlink data reception, after receiving downlink data transmission indicated by the physical downlink control channel (PDCCH), the UE may start a downlink backhaul timer (HARQ Round Trip Time (RTT) Timer) for a corresponding Hybrid Automatic Retransmission (HARQ) process. If data in the HARQ process is not decoded after the HARQ RTT Timer expires, the UE starts a retransmission timer (drx-RetransmissionTimer), and is activated to monitor the PDCCH, to wait for transmission scheduled by the network.

As for uplink data transmission, the UE may start an uplink backhaul timer (HARQ RTT Timer) for a corresponding HARQ process after receiving uplink data transmission indicated by the PDCCH. After the HARQ RTT Timer expires, the UE starts the retransmission timer (drx-RetransmissionTimer), and is activated to monitor the PDCCH, to wait for transmission scheduled by the network.

2. Sidelink

The LTE system supports the sidelink, which is used for direct data transmission between UE and UE without a network device. The UE sends the SCI through the physical sidelink control channel (PSCCH), and schedules transmission of a Physical Sidelink Shared Channel (PSSCH) to send data. The transmission is in the form of broadcast, and a receive end does not feed back to a transmit end whether reception is successful.

The design of LTE sidelink supports two resource allocation modes: a scheduled resource allocation mode (usually referred to as mode-1) and an autonomous resource selection mode. The scheduled resource allocation mode is controlled by the network side device and allocates a resource for each UE. For the autonomous resource selection mode, the resource is selected by the UE autonomously.

3. Other Terms

It should be noted that "l" in this specification represents "or". For example, A/B may indicate A or B; "and/or" in this specification merely describes an association relationship between associated objects, and indicates that there may be three relationships. For example, A and/or B may indicate three cases: only A exists, both A and B exist, and only B exists.

It should be noted that, for ease of clearly describing the technical solutions in the embodiments of this application, in the embodiments of this application, the words "first", "second", and the like are used to distinguish between same or similar items with basically the same functions. A person skilled in the art may understand that the words "first", "second", and the like do not limit a quantity and an execution sequence. For example, a first threshold, a second threshold are used to distinguish between different UEs, but are not used to describe a particular sequence of the UEs.

It should be noted that, in the embodiments of the present disclosure, words such as "exemplary" or "for example" are used to indicate an example, an instance, or descriptions. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

It should be noted that, in this embodiment of this application, "of", "relevant", and "corresponding" may be used in a mixed manner. It should be noted that, when a difference is not emphasized, meanings to be expressed by them are the same. In the embodiments of this application, "multiple" means two or more.

The following describes the solutions provided in the embodiments of the present disclosure with reference to the accompanying drawings.

The technical solutions provided in the present disclosure may be performed by various communications systems, for example, a 5G communications system, a future evolved system, or a plurality of communications fusion systems. There may be multiple application scenarios, for example, machine-to-machine (M2M), D2M, macro-micro communication, enhance Mobile Broadband (eMBB), ultra Reliable & Low Latency Communication (uRLLC), and Massive Machine Type Communication (mMTC). These scenarios include but are not limited to: scenarios such as communication between UE and UE, communication between network side devices, or communication between a network side device and UE. The embodiments of the present disclosure may be performed by communication between a network side device and UE, communication between UE and UE, or communication between network devices in a 5G communications system.

Figure 1:
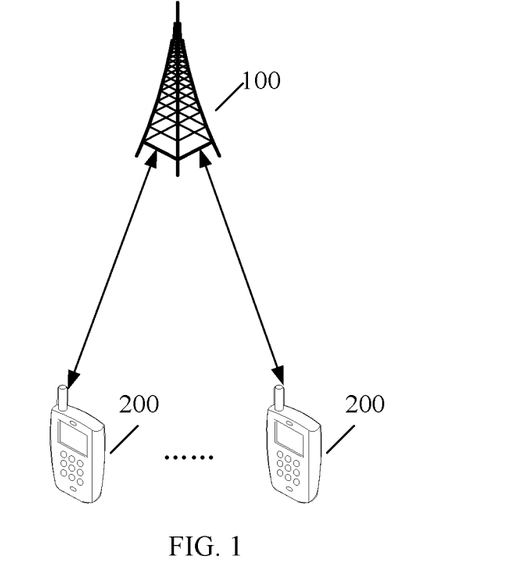
FIG. 1 is a possible schematic structural diagram of a communications system according to an embodiment of the present disclosure.

FIG. 1 is a possible schematic structural diagram of a communications system according to an embodiment of the present disclosure. As shown in FIG. 1, the communications system includes at least one network side device 100 (only one network side device is shown in FIG. 1) and one or more UE 200 connected to each network side device 100.

The network side device 100 may be a base station, a core network device, a Transmission and Reception Point (TRP), a relay station, an access point, or the like. The network side device 100 may be a Base Transceiver Station (BTS) in a Global System for Mobile communication (GSM) or a Code Division Multiple Access (CDMA) network, may be an NB (NodeB) in a Wideband Code Division Multiple Access (WCDMA) system, or may be an eNB or an eNodeB (evolutional NodeB) in an LTE system. The network side device 100 may further be a wireless controller in a Cloud Radio Access Network (CRAN) scenario. The network side device 100 may further be a network side device in the 5G communications system or a network side device in a future evolved network. However, the term used does not constitute a limitation on the present disclosure.

The UE 200 may be a terminal device, and the terminal device may be a wireless terminal device or a wired terminal device. The wireless terminal device may be a device that provides voice and/or other service data connectivity for a user, a handheld device with a wireless communication function, a computing device, or another processing device connected to a wireless modem, an in-vehicle device, a wearable device, a terminal device in a future 5G network, a terminal device in a future evolved PLMN network, or the like. The wireless terminal device may communicate with one or more core networks by using a Radio Access Network (RAN). The wireless terminal device may be a mobile terminal device, such as a mobile phone (or referred to as a "cellular" phone) and a computer with a mobile terminal device. For example, the wireless terminal device may be a portable, pocket-sized, handheld, computer built-in, or in-vehicle mobile apparatus that exchanges voice and/or data with a radio access network, and a device such as a Personal Communication Service (PCS) phone, a cordless phone, a Session Initiation Protocol (SIP) phone, a Wireless Local Loop (WLL) station, or a Personal Digital Assistant (PDA). The wireless terminal device may also be a mobile device, User Equipment (UE), a UE terminal device, an access terminal device, a wireless communications device, a terminal device unit, a terminal device station, a mobile station, a mobile console, a remote station, a remote terminal, a subscriber unit, a subscriber station, a user agent, a terminal device apparatus, or the like. In an example, in this embodiment of the present disclosure, a mobile phone is shown as an example of the terminal device in FIG. 1.

Figure 2:
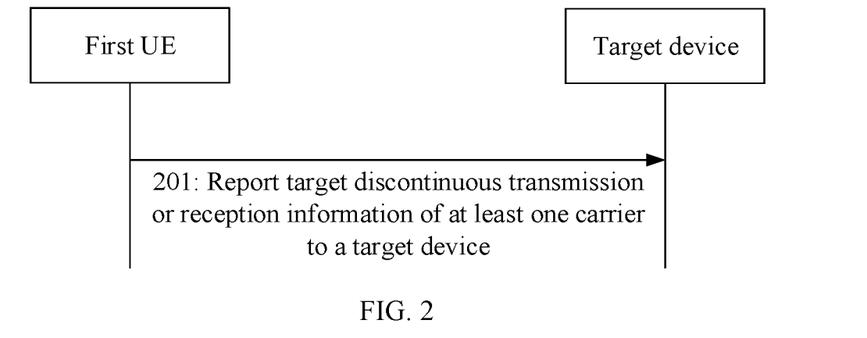
FIG. 2 is a schematic flowchart 1 of an information reporting method according to an embodiment of the present disclosure.

FIG. 2 is a schematic flowchart of an information reporting method according to an embodiment of the present disclosure. As shown in FIG. 2, the information reporting method may include the following steps.

Step 201: First UE reports target discontinuous transmission or reception information of at least one carrier to a target device.

The target discontinuous transmission or reception information is used to indicate a target discontinuous transmission or reception mode of second UE; the target discontinuous transmission or reception mode includes at least one of the following: a first Uu discontinuous transmission or reception mode, a second Uu discontinuous transmission or reception mode, and a sidelink discontinuous transmission or reception mode. The second Uu discontinuous transmission or reception mode is a Uu discontinuous transmission or reception mode used by UE with a first sidelink resource allocation mode.

In this embodiment of the present disclosure, the target device includes third UE or a network side device.

It should be noted that the first Uu discontinuous transmission or reception mode refers to a discontinuous transmission or reception mode used for a Uu PDCCH; and the Uu refers to a Uu interface between the UE and the network side device. The second Uu discontinuous transmission or reception mode refers to a Uu discontinuous transmission or reception mode of the second UE using the first sidelink resource allocation mode, where a Uu interface of the second UE using the first sidelink resource allocation mode may be regarded as a scheduled Uu interface in a sidelink. Therefore, the second Uu discontinuous transmission or reception mode may be referred to as a scheduled Uu discontinuous transmission or reception mode for short. The sidelink discontinuous transmission or reception mode refers to a discontinuous transmission or reception mode used on the sidelink.

For example, the first sidelink resource allocation mode may be a model mode in the sidelink, or may be a derivative mode used when other network side devices schedule the sidelink, which is not limited in this embodiment of the present disclosure.

It should be noted that the first UE and the second UE may be a same UE, or may be different UEs. The second UE may include one or more UEs.

In this embodiment of the present disclosure, the discontinuous transmission or reception information reported by the first UE may be discontinuous transmission or reception information of the first UE, or may also be discontinuous transmission or reception information of other UEs other than the first UE. For example, the target UE may be the first UE, that is, the first UE reports the discontinuous transmission or reception information of the first UE; or, the target UE is other UEs other than the first UE and one or more UEs in the first UE, that is, the first UE reports discontinuous transmission or reception information thereof or discontinuous transmission or reception information of other UEs; or the target UE may be one or more UEs in other UEs other than the first UE, that is, the first UE reports discontinuous transmission or reception information of other UEs.

The solution provided in this embodiment of the present disclosure may be applicable to a scenario in which a sending UE sends feedback information to the network side device, and a scenario in which a receiving UE sends feedback information to the network side device.

In this embodiment of the present disclosure, when the first UE reports the discontinuous transmission or reception information of the target UE, the discontinuous transmission or reception information may be reported by the first UE within the active time of the first UE, or may be reported by the first UE within the active time of the second UE, or may also be reported by the first UE in the active time within the active time of the second UE. The first UE may also report the discontinuous transmission or reception information within the non-active time of the first UE and/or the second UE, which is not limited in this embodiment of the present disclosure.

In this embodiment of the present disclosure, the target discontinuous transmission or reception information is used to indicate at least one of the following: in a case that the second UE is in an active state and is within an active time, a remaining active time of the second UE, a time at which the second UE enters a sleep state, configuration information of the target discontinuous transmission or reception mode used or activated for the second UE, first Downlink Control Information (DCI) received by the second UE, first SCI received by the second UE, at least one of sidelink grant used by the second UE and configuration information of the sidelink grant, first information, and second information; or the target discontinuous transmission or reception information is used to indicate at least one of the following: in a case that the second UE is in an inactive state and is within a non-active time, a remaining non-active time of the second UE, the time at which the second UE enters a sleep state, the configuration information of the target discontinuous transmission or reception mode, the first DCI received by the second UE, the first SCI received by the second UE, at least one of the sidelink grant used by the second UE and the configuration information of the sidelink grant, the first information, and the second information.

The resource indicated by the first SCI includes at least a resource used for initial transmission.

For example, the first information includes at least one of the following: the second UE starts a first timer of the target discontinuous transmission or reception mode, a start time of the first timer, and a remaining time of the first timer; and the second information includes at least one of the following: the second UE restarts a second timer of the target discontinuous transmission or reception mode, a restart time of the second timer, and a remaining time of the second timer.

For example, the resource indicated by the first DCI includes at least a resource used for initial transmission; or the resource indicated by the first DCI indicates activation of a sidelink resource or deactivation of a sidelink resource. In an example, the resource indicated by the first DCI includes at least a resource used for initial transmission, and the resource indicated by the first DCI is also used to indicate the activation sidelink resource.

For example, the first timer and the second timer may be the same or different, which is not limited in this embodiment of the present disclosure.

For example, the configuration information of the sidelink grant is used to indicate a resource on the configured sidelink grant used by the second UE, for example, at least one of an ID of the used resource, a location of the used resource, and a quantity of used resources.

In this embodiment of the present disclosure, the sidelink grant includes a configured sidelink grant and/or the DCI (SL DCI) for scheduling the sidelink resource. The SL DCI is DCI that schedules or activates or deactivates the sidelink resource, for example, DCI format 3_0.

It should be noted that the scheduling of the sidelink resource refers to scheduling in a broad sense. For example, the scheduling of the sidelink resource may include: scheduling sidelink transmission, activating the sidelink resource, or deactivating the sidelink resource.

In this embodiment of the present disclosure, the configuration information of the target discontinuous transmission or reception mode includes at least one of the following: information about a discontinuous transmission cycle of the target discontinuous transmission or reception mode, information about a timer of the target discontinuous transmission or reception mode, offset information of the discontinuous transmission cycle, activation information corresponding to an active time of the target discontinuous transmission or reception mode, and inactive information corresponding to a non-active time of the target discontinuous transmission or reception mode.

For example, the discontinuous transmission of the target discontinuous transmission or reception mode may be a discontinuous transmission cycle used or activated for the second UE. Further, the information about the discontinuous transmission cycle of the target discontinuous transmission or reception mode may be used to indicate whether the discontinuous transmission cycle is a long discontinuous transmission cycle or a short discontinuous transmission cycle; and the information about the discontinuous transmission cycle may include a length of the discontinuous transmission cycle.

For example, information about a timer of the target discontinuous transmission or reception mode may include a running duration of the timer. In an example, the timer includes at least one of the following timers: a wait-forretransmission timer (for example, drx-HARQ-RTT-Timer), a retransmission timer (for example, drx-Retransmission-Timer), an operating time timer (discontinuous transmission-onDurationTimer), an active timer (for example, drx-InactivityTimer), a short cycle timer (for example, drx-ShortCycleTime).

For example, offset information of the discontinuous transmission cycle of the target discontinuous transmission or reception mode may include: a time offset of the discontinuous transmission cycle. For example, taking DRX as an example, if the DRX cycle is a long DRX cycle, the time offset may be drx-LongCycleStartOffset; and if the DRX cycle is a short DRX cycle, the time offset may be drx-SlotOffset.

For example, the activation information corresponding to the active time of the target discontinuous transmission or reception mode is used to indicate the timer included in the active time.

In this embodiment of the present disclosure, the timer of the target discontinuous transmission or reception mode includes at least one of the following: a wait-for-retransmission timer and a retransmission timer.

A running time of the timer in this embodiment of the present disclosure is a logical time or a physical time.

For example, the second UE may use a configured timer, or may also configure and determine a timer, or may dynamically determine a timer based on actual scheduling, which may be determined based on actual using requirements, and is not limited in this embodiment of the present disclosure.

In this embodiment of the present disclosure, in a case that the target device is third UE, the target discontinuous transmission or reception mode includes at least one of the following: the first Uu discontinuous transmission or reception mode, the second Uu discontinuous transmission or reception mode, and the sidelink discontinuous transmission or reception mode; or in a case that the target device is a network side device, or in a case that unicast transmission is performed between the second UE and the target device, the target discontinuous transmission or reception mode includes at least one of the following: the second Uu discontinuous transmission or reception mode and the sidelink discontinuous transmission or reception mode.

Further, in this embodiment of the present disclosure, the third UE includes any one of the following: relay UE, remote UE, pedestrian UE (PUE), vehicle UE, scheduling UE, scheduled UE, namely, a user scheduled by other users, and a user who have resources provided by other users), and UE using the second sidelink resource allocation mode.

Example 1

When the target device (namely, a receive end of discontinuous transmission or reception information, and it should be noted that users in the sidelink may perform receiving or transmission at different times) is the network side device (in other words, the first UE is a user scheduled by the network side device or a user within the coverage of the network side device), the target discontinuous transmission or reception mode is at least one of the scheduled Uu discontinuous transmission or reception mode and the sidelink discontinuous transmission or reception mode. When the target device is the network side device, and the network side device does not fully understand SL discontinuous transmission or reception information of the target UE (for example, whether the target UE is in the active time of SL discontinuous transmission), in this embodiment of the present disclosure, the discontinuous transmission or reception information of the target UE is reported to the network side device, so that the network side device can learn the SL discontinuous transmission or reception information of the target UE.

Example 2

When the target device is the Relay UE, or the first UE is the remote UE, or the second UE is the remote UE, the target discontinuous transmission or reception mode is at least one of the first Uu discontinuous transmission or reception mode, the scheduled Uu discontinuous transmission or reception mode, and the sidelink discontinuous transmission or reception mode. At this time, a transmit end (namely, the first UE) may be remote UE. A possible situation is that the remote UE is covered by the network device, and the relay UE is outside the coverage of the network device or covered by other network devices. At this time, the relay UE does not fully understand the Uu discontinuous transmission or reception information of the first UE. Therefore, the first UE reports the Uu discontinuous transmission or reception information to the relay UE, so that transmission between transceivers can be adjusted based on the Uu discontinuous transmission.

Example 3

When the target device is the Remote UE, or the first UE is the relay UE, or the second UE is the relay UE, the target discontinuous transmission or reception mode is at least one of the first Uu discontinuous transmission or reception mode, the scheduled Uu discontinuous transmission or reception mode, and the sidelink discontinuous transmission or reception mode. At this time, a transmit end (namely, the first UE) may be relay UE. A possible situation is that the relay UE is covered by the network device, and the remote UE is outside the coverage of the network device or covered by other network devices. At this time, the remote UE does not fully understand the Uu discontinuous transmission or reception information of the first UE. Therefore, the first UE reports the Uu discontinuous transmission or reception information to the remote UE, so that transmission between transceivers can be adjusted based on the Uu discontinuous transmission.

Example 4

In a case that the second UE performs unicast transmission, the target discontinuous transmission or reception mode is at least one of the first Uu discontinuous transmission or reception mode and the scheduled Uu discontinuous transmission or reception mode. It should be noted that the second UE performs unicast transmission refers to: in addition to the unicast transmission performed between the second UE and the target device, the second UE may also perform other forms of transmission such as multicast and broadcast, which is not limited in this embodiment of the present disclosure.

For example, when sidelink unicast transmission is performed between the second UE and the target device, it may be regarded that the second UE and the target device may negotiate a sidelink discontinuous transmission configuration. If one of the second UE and the target device performs transmission or reception through the Uu interface, at this time, the other one only needs to learn discontinuous transmission or reception information related to the Uu, that is, the target discontinuous transmission or reception mode is at least one of the scheduled Uu discontinuous transmission or reception mode and the sidelink discontinuous transmission or reception mode.

Example 5

In a case that the target device is the Pedestrian UE (PUE), the target discontinuous transmission or reception mode is at least one of the first Uu discontinuous transmission or reception mode, the scheduled Uu discontinuous transmission or reception mode, and the sidelink discontinuous transmission or reception mode. Since capability of the PUE may be poor and long-term signaling search or monitoring cannot be performed, other users need to adapt to a discontinuous transmission state of the PUE. At this time, the PUE needs to send the discontinuous transmission or reception information. Therefore, the target discontinuous transmission or reception mode includes at least one of the Uu discontinuous transmission or reception mode, the scheduled Uu discontinuous transmission or reception mode, and the sidelink discontinuous transmission or reception mode.

Example 6

When the target device is the scheduling UE or header UE that can schedule other users, or the first UE is the scheduled UE, or the second UE is the scheduled UE, the target discontinuous transmission or reception mode is at least one of the first Uu discontinuous transmission or reception mode, the scheduled Uu discontinuous transmission or reception mode, and the sidelink discontinuous transmission or reception mode. Specific reasons are shown in Example 2.

Example 7

When the target device is the scheduled UE (namely, a user scheduled by other users), or the first UE or the second UE is the scheduling UE or the header UE, the target discontinuous transmission or reception mode is at least one of the first Uu discontinuous transmission or reception mode, the scheduled Uu discontinuous transmission or reception mode, and the sidelink discontinuous transmission or reception mode. Specific reasons are shown in Example 3.

Example 8

In a case that the first UE and/or the second UE are UEs that may obtain resources by themselves, the target discontinuous transmission or reception mode may be the sidelink discontinuous transmission or reception mode.

In this embodiment of the present disclosure, step 201 may include the following step.

Step 201a: Report target discontinuous transmission or reception information of at least one carrier to the target device based on a device type of the first UE and/or the second UE.

In this embodiment of the present disclosure, step 201 may include the following step.

Step 201b: The first UE reports target discontinuous transmission or reception information of at least one carrier to the target device in a case that a predetermined condition is satisfied.

For example, the predetermined condition includes at least one of the following:

a network side device instructs target UE to report discontinuous transmission or reception information;
the target UE is preconfigured to report the discontinuous transmission or reception information;
third UE or other UE instructs the target UE to report the discontinuous transmission or reception information;
a protocol provides that the target UE reports the discontinuous transmission or reception information;
the target UE selects or activates a discontinuous transmission configuration;
the target UE enters an active time;
the target UE enters a non-active time;
a timer of the target discontinuous transmission or reception mode used or activated by the target UE is running;
a timer of the target discontinuous transmission or reception mode used or activated by the target UE expires;
the target UE starts or restarts the timer of the target discontinuous transmission or reception mode;
the target UE receives first SCI;
the target UE receives first DCI;
a number of transmissions or receptions of the target UE reaches a first threshold;
a number of failure transmissions or receptions of the target UE reaches a second threshold;
a number of discontinuous transmissions or receptions (DTX) of the target UE reaches a third threshold;
a number of Negative Acknowledgement (NACK) received by the target UE reaches a fourth threshold;
the target UE performs transmission or reception on a sidelink grant;
the target UE is preempted of a resource;
the target UE preempts a resource;
the target UE enables or disables a sidelink feedback; and
the target UE enables or disables a sidelink feedback report.

The target UE includes at least one of the following: the second UE and the first UE; and the resource indicated by the first SCI includes at least a resource used for initial transmission.

For example, the resource indicated by the first DCI includes at least a resource used for initial transmission; or the resource indicated by the first DCI indicates activation of a sidelink resource or deactivation of a sidelink resource. In an example, the resource indicated by the first DCI includes at least a resource used for initial transmission, and the resource indicated by the first DCI is also used to indicate the activation sidelink resource.

For example, the sidelink feedback refers to receiving or sending sidelink HARQ-ACK on the sidelink. The sidelink feedback report refers to: reporting the sidelink HARQ-ACK to the network side device through the PUCCH or the PUSCH. As for that the network side device to disable the sidelink feedback report, in an example, the network side device is not configured with the PUCCH or the PUSCH for reporting sidelink HARQ-ACK, and in this case, the user selects a shorter RTT timer.

It should be noted that the first threshold, the second threshold, the third threshold, and the fourth threshold may be pre-configured or predefined on the network side, or may be specified by a protocol, which is not limited in this embodiment of the present disclosure. Further, values of the first threshold, the second threshold, the third threshold, and the fourth threshold may be the same or different.

Figure 3:
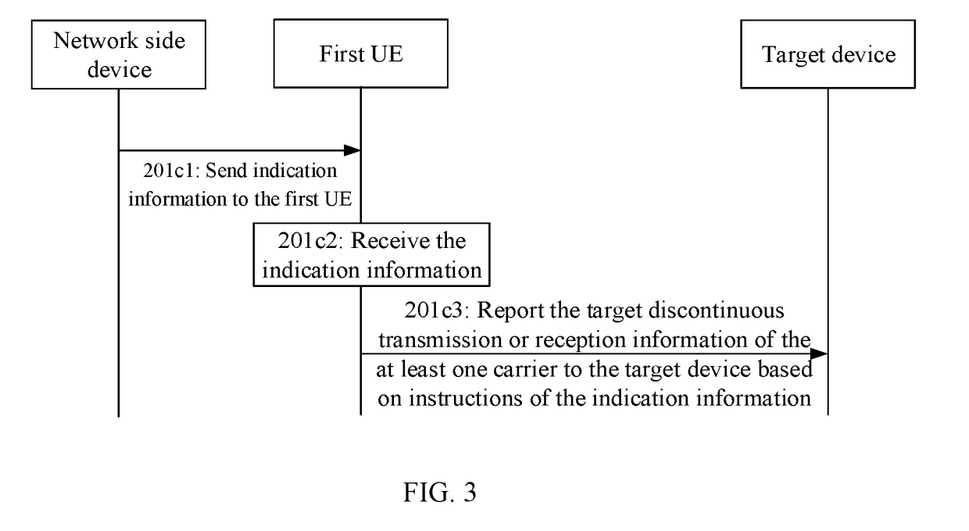
FIG. 3 is a schematic flowchart 2 of an information reporting method according to an embodiment of the present disclosure.

For example, as shown in FIG. 3, before step 201, the method further includes:

Step 201c1: The network side device sends indication information to the first UE.

Step 201*c*2: The first UE receives the indication information sent by the network side device, and the indication information is used to instruct the first UE to report the target discontinuous transmission or reception information of the at least one carrier to the target device.

Further, based on step 201*c*1, step 201 may include the following step.

Step 201*c*3: The first UE reports the target discontinuous transmission or reception information of the at least one carrier to the target device based on instructions of the indication information.

For example, the number of transmissions or receptions of the target UE may be a number of transmissions or receptions of data transmitted by the target UE, or may be a number of transmissions or receptions of other signals (for example, a reference signal (RS), a sequence, and control signaling) transmitted by the target UE other than the data.

For example, the first DCI or the first SCI indicates one or more transmission resources, where the one or more transmission resources include at least a resource used for initial transmission of an SL message, an SL signal, or an SL transport block (TB) or code block group (CBG). Further, the one or more transmission resources may further include a resource used for retransmission.

For example, taking DRX as an example, the timer of the target discontinuous transmission or reception mode includes at least one of the following: drx-HARQ-RTT-Timer, drx-RetransmissionTimer, drx-OnDurationTimer, drx-InactivityTimer, and drxShortCycleTimer.

For example, taking DRX as an example, the case that the timer in the target DRX mode used or activated by the target UE expires includes the following examples:

Example 1: drx-HARQ-RTT-Timer expires. At this time, the target UE may start to enter or remain the active state, or monitors the PDCCH or the SCI. Therefore, after reporting the DRX information of the second UE to the network side device, the network side device may schedule the second UE in a subsequent period of time.

Example 2: drx-RetransmissionTimer expires. At this time, the target UE may enter or remain the inactive state for a period of time, or may not monitor the PDCCH or the SCI. Therefore, after reporting the DRX information of the second UE to the network side device, the network side device may avoid scheduling the second UE in a subsequent period of time.

Example 3: drx-onDurationTimer expires. At this time, the target UE may enter or remain the inactive state, or may not monitor the PDCCH or the SCI. Therefore, after reporting the DRX information of the second UE to the network side device, the network side device may avoid scheduling the second UE in a subsequent period of time.

Example 4: drx-InactivityTimer expires. At this time, the target UE may enter or remain the inactive state, or may not monitor the PDCCH or the SCI. Therefore, after reporting the DRX information of the second UE to the network side device, the network side device may avoid scheduling the second UE in a subsequent period of time.

Example 5: drxShortCycleTimer expires. At this time, the target UE may enter a long cycle. Therefore, after reporting the DRX information of the second UE to the network side device, the network side device may extend a scheduling interval thereof.

For example, the case that the target UE starts or restarts the timer in the target DRX mode includes the following examples:

Example 6: the target UE starts or restarts drx-HARQ-RTT-Timer. At this time, the target UE may start to enter or remain the inactive state, or may not monitor the PDCCH or the SCI. Therefore, after reporting the DRX information of the second UE to the network side device, the network side device may avoid scheduling the second UE in a subsequent period of time.

Example 7: the target UE starts or restarts drx-RetransmissionTimer. At this time, the target UE may start to enter or remain the active state, or monitors the PDCCH or the SCI. Therefore, after reporting the DRX information of the second UE to the network side device, the network side device may schedule the second UE in a subsequent period of time.

Example 8: the target UE starts or restarts drx-onDurationTimer. At this time, the target UE may start to enter or remain the active state, or monitors the PDCCH or the SCI. Therefore, after reporting the DRX information of the second UE to the network side device, the network side device may schedule the second UE in a subsequent period of time.

Example 9: the target UE starts or restarts drx-InactivityTimer. At this time, the target UE may start to enter or remain the active state, or monitors the PDCCH or the SCI. Therefore, after reporting the DRX information of the second UE to the network side device, the network side device may schedule the second UE in a subsequent period of time.

Example 10: the target UE starts or restarts drxShortCycleTimer. At this time, the target UE may start to enter or remain the active state, or monitors the PDCCH or the SCI. Therefore, after reporting the DRX information of the second UE to the network side device, the network side device may schedule the second UE in a subsequent period of time.

For example, when the target UE receives the first SCI, it is reported that the target UE has received the SCI indicating the initial transmission. Thus, the user needs to start or restart an inactivity timer (for example, drx-InactivityTimer) to enter or maintain the active state. Therefore, after reporting the DRX information of the second UE to the network side device, the network side device may still schedule the second UE in a subsequent period of time.

For example, when the number of transmissions or receptions of the target UE reaches a predetermined threshold, at this time, the target UE may no longer continue to perform transmission or retransmission, or no longer monitor the SCI or detect the PSFCH. Therefore, after reporting the discontinuous transmission or reception information of the second UE to the network side device, the target UE enters a sleep state, and the network side device avoids scheduling the second UE in a subsequent period of time.

For example, the target UE obtains a resource for transmission and then enters the sleep state. Therefore, if the target UE is preempted of the resource, the target UE needs to continue to obtain other available resources, and thus cannot enter the sleep state.

In this embodiment of the present disclosure, the target discontinuous transmission or reception information includes configuration information of a discontinuous transmission or reception mode supported by the second UE. For example, the first UE may further report configuration information of a supported or preferred or acceptable discontinuous transmission or reception mode or a discontinuous transmission or reception mode that the first UE and/or the second UE is interested in to the network side device. For example, the user reports related information of bs-scheduled Uu DRX or the SL DRX, for example, reporting a preferred or acceptable or supported related Timer value or a related Timer value that the user is interested in.

In this embodiment of the present disclosure, if the target UE uses a target transmission resource, or regardless of whether the target UE uses the target transmission resource, an operating state of the target UE remains unchanged.

In this embodiment of the present disclosure, if the target UE uses a target transmission resource, or regardless of whether the target UE uses the target transmission resource, the target transmission resource is in the active time, or the target UE is in the active time on the target transmission resource.

The target transmission resource is at least one transmission resource of the sidelink grant. The target UE includes at least one of the following: the second UE or the first UE.

For example, taking at least one transmission resource of the configured sidelink grant as an example. When the target UE is in the active state (namely, the active time includes the configured sidelink grant), if the target UE actually uses the at least one transmission resource of the configured sidelink grant for transmission, the target UE is still in the active state; or regardless of whether the target UE actually uses the at least one transmission resource of the configured sidelink grant for transmission, the target UE is in the active state. At this time, if there is an operating RTT Timer, the RTT Timer is turned off.

In this embodiment of the present disclosure, the information reporting method provided in this embodiment of the present disclosure may further include the following step.

Step 202: In a case that target UE uses a target transmission resource, or regardless of whether the target UE uses the target transmission resource, start or restart a wait-for-retransmission timer.

For example, when starting or restarting the wait-for-retransmission timer, the first UE may not monitor the PDCCH or the sidelink grant within the running time of the wait-for-retransmission timer.

The target transmission resource is at least one transmission resource of the sidelink grant. The target UE includes at least one of the following: the second UE and the first UE.

For example, taking at least one transmission resource of the configured sidelink grant as an example, if the target UE actually uses at least one transmission resource of the configured sidelink grant for transmission, the target UE starts or restarts the RTT Timer, and does not monitor the PDCCH or the SL DCI during a running time of the RTT Timer; or regardless of whether the target UE actually uses the at least one transmission resource of the configured sidelink grant for transmission, the target UE starts or restarts the RTT Timer, and does not monitor the PDCCH or the SL DCI during the running time of the RTT Timer.

It should be noted that, all the relevant contents described for the DRX in the embodiments of the present disclosure may be extended to discontinuous transmission. To avoid repetition, details are not repeated herein.

According to the information reporting method provided in the embodiments of the present disclosure, the first UE reports the target discontinuous transmission or reception information of the at least one carrier to the target device, so that the target device may learn the discontinuous transmission or reception information of the first UE of the target discontinuous transmission or reception mode (including at least one of the following: a first Uu discontinuous transmission or reception mode, a second Uu discontinuous transmission or reception mode, and a sidelink discontinuous transmission or reception mode). Further, the target device may learn a discontinuous transmission state (an active state or an inactive state) of the second UE. In this way, it is ensured that the target device has a consistent understanding with the second UE, so that appropriate sidelink resources can be allocated to the second UE, and reliability of a sidelink service is improved.

Figure 4:
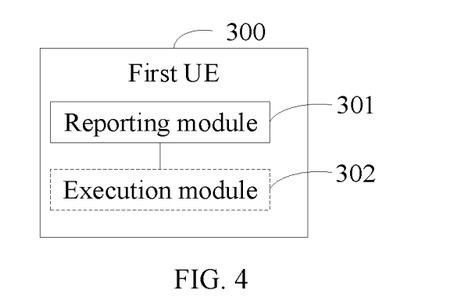
FIG. 4 is a schematic structural diagram of UE according to an embodiment of the present disclosure.

FIG. 4 is a possible schematic structural diagram of UE according to an embodiment of the present disclosure. The UE is first UE, and as shown in FIG. 4, the first UE 300 includes a reporting module 301, where:

the reporting module 301 is configured to report target discontinuous transmission or reception information of at least one carrier to a target device, where the target discontinuous transmission or reception information is used to indicate a target discontinuous transmission or reception mode of second UE; the target discontinuous transmission or reception mode includes at least one of the following: a first Uu discontinuous transmission or reception mode, a second Uu discontinuous transmission or reception mode, and a sidelink discontinuous transmission or reception mode, where the second Uu discontinuous transmission or reception mode is a Uu discontinuous transmission or reception mode used by UE with a first sidelink resource allocation mode.

The target discontinuous transmission or reception information is used to indicate at least one of the following: in a case that the second UE is in an active state and is within an active time, a remaining active time of the second UE, a time at which the second UE enters a sleep state, configuration information of the target discontinuous transmission or reception mode used or activated for the second UE, first DCI received by the second UE, first SCI received by the second UE, at least one of sidelink grant used by the second UE and configuration information of the sidelink grant, first information, and second information; or the target discontinuous transmission or reception information is used to indicate at least one of the following: in a case that the second UE is in an inactive state and is within a non-active time, a remaining non-active time of the second UE, the time at which the second UE enters a sleep state, the configuration information of the target discontinuous transmission or reception mode, the first DCI received by the second UE, the first SCI received by the second UE, at least one of the sidelink grant used by the second UE and the configuration information of the sidelink grant, the first information, and the second information, where for example, the resource indicated by the first DCI includes at least a resource used for initial transmission, or the resource indicated by the first DCI indicates activation of a sidelink resource or deactivation of a sidelink resource; the resource indicated by the first SCI includes a resource used for initial transmission; the first information includes at least one of the following: the second UE starts a first timer of the target discontinuous transmission or reception mode, a start time of the first timer, and a remaining time of the first timer; and the second information includes at least one of the following: the second UE restarts a second timer of the target discontinuous transmission or reception mode, a restart time of the second timer, and a remaining time of the second timer.

The configuration information of the target discontinuous transmission or reception mode includes at least one of the following: information about a discontinuous transmission cycle of the target discontinuous transmission or reception mode, information about a timer of the target discontinuous transmission or reception mode, offset information of the discontinuous transmission cycle, activation information corresponding to an active time of the target discontinuous transmission or reception mode, and inactive information corresponding to a non-active time of the target discontinuous transmission or reception mode.

In a case that the target device is third UE, the target discontinuous transmission or reception mode includes at least one of the following: the first Uu discontinuous transmission or reception mode, the second Uu discontinuous transmission or reception mode, and the sidelink discontinuous transmission or reception mode; or in a case that the target device is a network side device, or in a case that unicast transmission is performed between the second UE and the target device, the target discontinuous transmission or reception mode includes at least one of the following: the second Uu discontinuous transmission or reception mode and the sidelink discontinuous transmission or reception mode.

The third UE includes any one of the following: relay UE, remote UE, pedestrian UE, vehicle UE, scheduling UE, scheduled UE, or UE using an allocation mode of a second sidelink resource.

The reporting module 301 is configured to: report target discontinuous transmission or reception information of at least one carrier to the target device based on a device type of the first UE 300 and/or the second UE.

The reporting module 301 is configured to: report target discontinuous transmission or reception information of at least one carrier to the target device in a case that a predetermined condition is satisfied.

The predetermined condition includes at least one of the following:
- a network side device instructs target UE to report discontinuous transmission or reception information;
- the target UE is preconfigured to report the discontinuous transmission or reception information;
- third UE or other UE instructs the target UE to report the discontinuous transmission or reception information;
- a protocol provides that the target UE reports the discontinuous transmission or reception information;
- the target UE selects or activates a discontinuous transmission configuration;
- the target UE enters an active time;
- the target UE enters a non-active time;
- a timer of the target discontinuous transmission or reception mode used or activated by the target UE is running;
- a timer of the target discontinuous transmission or reception mode used or activated by the target UE expires;
- the target UE starts or restarts the timer of the target discontinuous transmission or reception mode;
- the target UE receives first SCI;
- the target UE receives first DCI;
- a number of transmissions or receptions of the target UE reaches a first threshold;
- a number of failure transmissions or receptions of the target UE reaches a second threshold;
- a number of DTX of the target UE reaches a third threshold;
- a number of NACK received by the target UE reaches a fourth threshold;
- the target UE performs transmission or reception on a sidelink grant;
- the target UE is preempted of a resource;
- the target UE enables or disables a sidelink feedback; and
- the target UE enables or disables a sidelink feedback report.

The target UE includes at least one of the following: the second UE and the first UE 300. The resource indicated by the first DCI includes at least a resource used for initial transmission, or the resource indicated by the first DCI indicates activation of a sidelink resource or deactivation of a sidelink resource; and the resource indicated by the first SCI includes at least a resource used for initial transmission.

In a case that the target UE uses a target transmission resource, or regardless of whether the target UE uses the target transmission resource, an operating state of the target UE remains unchanged, where the target transmission resource is at least one transmission resource of the sidelink grant; and the target UE includes at least one of the following: the second UE and the first UE 300.

In a case that the target UE uses a target transmission resource, or regardless of whether the target UE uses the target transmission resource, the target UE is at an active time on the target transmission resource, where the target transmission resource is at least one transmission resource of the sidelink grant; and the target UE includes at least one of the following: the second UE and the first UE 300.

As shown in FIG. 4, the first UE 300 further includes an execution module 302, where the execution module 302 is configured to: in a case that the target UE uses a target transmission resource, or regardless of whether the target UE uses the target transmission resource, start or restart the wait-for-retransmission timer, and not monitor the PDCCH or the sidelink grant within the running time of the wait-for-retransmission timer, where the target transmission resource is at least one transmission resource of the sidelink grant; and the target UE includes at least one of the following: the second UE and the first UE 300.

According to the first UE provided in the embodiments of the present disclosure, the first UE reports the target discontinuous transmission or reception information of the at least one carrier to the target device, so that the target device may learn the discontinuous transmission or reception information of the first UE of the target discontinuous transmission or reception mode (including at least one of the following: a first Uu discontinuous transmission or reception mode, a second Uu discontinuous transmission or reception mode, and a sidelink discontinuous transmission or reception mode). Further, the target device may learn a discontinuous transmission state (an active state or an inactive state) of the second UE. In this way, it is ensured that the target device has a consistent understanding with the second UE, so that appropriate sidelink resources can be allocated to the second UE, and reliability of a sidelink service is improved.

The first UE 300 provided in this embodiment of the present disclosure can implement any process in the foregoing method embodiment. To avoid repetition, details are not described herein again.

It should be noted that, as shown in FIG. 4, a module required to be included in the first UE 300 is indicated by a solid line box, such as the reporting module 301; and a module that may or may not be included in the first UE 300 is indicated by a dashed box, such as the execution module 302.

Figure 5:
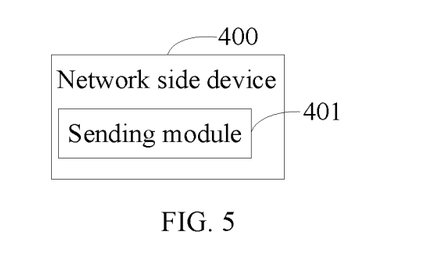
FIG. 5 is a schematic structural diagram 1 of a network side device according to an embodiment of the present disclosure.

FIG. 5 is a possible schematic structural diagram of a network side device according to an embodiment of the present disclosure. As shown in FIG. 5, the network side device 400 includes a sending module 401, where the sending module 401 is configured to send indication information to first user equipment UE, where the indication information is used to instruct the first UE to report target discontinuous transmission or reception information of at least one carrier to the network side device; the target discontinuous transmission or reception information is used to indicate a target discontinuous transmission or reception mode of second UE; the target discontinuous transmission or reception mode includes at least one of the following: a first Uu discontinuous transmission or reception mode, a second Uu discontinuous transmission or reception mode, and a sidelink discontinuous transmission or reception mode, where the second Uu discontinuous transmission or reception mode is a Uu discontinuous transmission or reception mode used by UE with a first sidelink resource allocation mode.

According to the network side device provided in the embodiments of the present disclosure, the network side device sends indication information to the first UE, so as to instruct the first UE to report the target discontinuous transmission or reception information of the at least one carrier to the target device, so that the target device may learn the discontinuous transmission or reception information of the first UE of the target discontinuous transmission or reception mode (including at least one of the following: a first Uu discontinuous transmission or reception mode, a second Uu discontinuous transmission or reception mode, and a sidelink discontinuous transmission or reception mode). Further, the target device may learn a discontinuous transmission state (an active state or an inactive state) of the second UE. In this way, it is ensured that the target device has a consistent understanding with the second UE, so that appropriate sidelink resources can be allocated to the second UE, and reliability of a sidelink service is improved.

The network side device provided in this embodiment of the present disclosure can implement the processes in the foregoing method embodiments. To avoid repetition, details are not described herein again.

Figure 6:
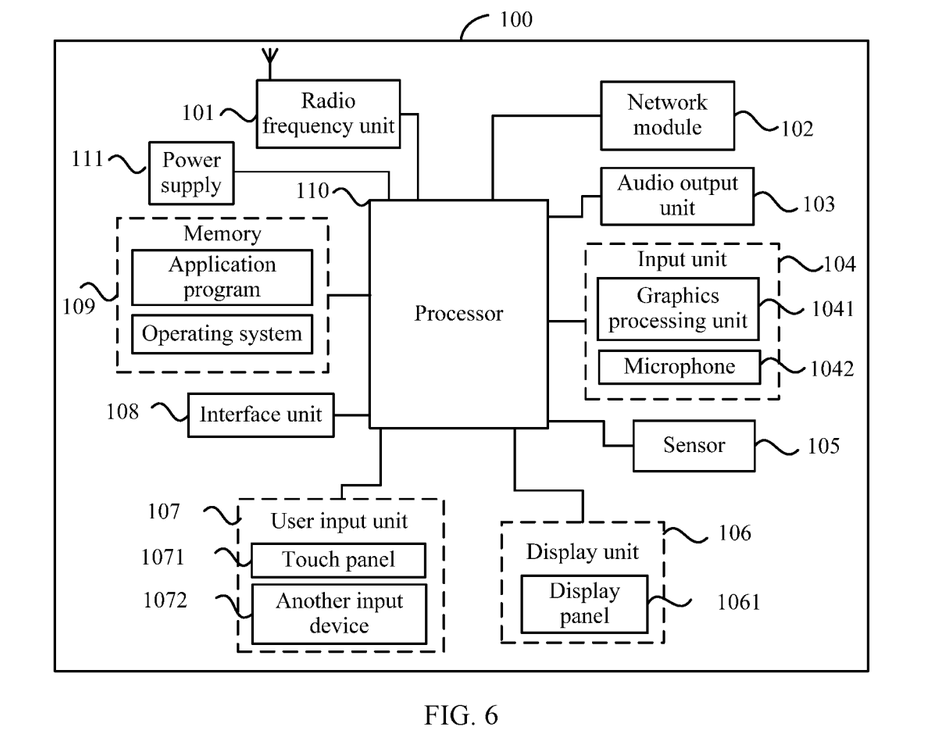
FIG. 6 is a schematic structural diagram of a terminal device according to an embodiment of the present disclosure.

The case where the first UE is a terminal device is taken as an example. FIG. 6 is a schematic structural diagram of hardware of a terminal device implementing the embodiments of the present disclosure. The terminal device 100 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. A person skilled in the art may understand that a structure of the terminal device 100 shown in FIG. 6 does not constitute a limitation on the terminal device, and the terminal device 100 may include more or fewer components than those shown in the figure, or combine some components, or have different component arrangements. In this embodiment of the present disclosure, the terminal device 100 includes but is not limited to a mobile phone, a tablet computer, a laptop computer, a palmtop computer, an in-vehicle terminal device, a wearable device, a pedometer, and the like.

The radio frequency unit 101 is configured to report target discontinuous transmission or reception information of at least one carrier to a target device, where the target discontinuous transmission or reception information is used to indicate a target discontinuous transmission or reception mode of second UE; the target discontinuous transmission or reception mode includes at least one of the following: a first Uu discontinuous transmission or reception mode, a second Uu discontinuous transmission or reception mode, and a sidelink discontinuous transmission or reception mode, where the second Uu discontinuous transmission or reception mode is a Uu discontinuous transmission or reception mode used by UE with a first sidelink resource allocation mode.

According to the terminal device provided in the embodiments of the present disclosure, the terminal device reports the target discontinuous transmission or reception information of the at least one carrier to the target device, so that the target device may learn the discontinuous transmission or reception information of the terminal device of the target discontinuous transmission or reception mode (including at least one of the following: a first Uu discontinuous transmission or reception mode, a second Uu discontinuous transmission or reception mode, and a sidelink discontinuous transmission or reception mode). Further, the target device may learn a discontinuous transmission state (an active state or an inactive state) of the second terminal device. In this way, it is ensured that the target device has a consistent understanding with the second terminal device, so that appropriate sidelink resources can be allocated to the second terminal device, and reliability of a sidelink service is improved.

It should be understood that, in this embodiment of the present disclosure, the radio frequency unit 101 may be configured to receive and send information or receive and send a signal in a call process. After downlink data from a base station is received, the processor 110 processes the downlink data. In addition, uplink data is sent to the base station. Usually, the radio frequency unit 101 includes but is not limited to an antenna, at least one amplifier, a transceiver, a coupler, a low noise amplifier, a duplexer, and the like. In addition, the radio frequency unit 101 may communicate with a network and another device through a wireless communications system.

The terminal device 100 provides wireless broadband Internet access for the user by using the network module 102, for example, helping the user send and receive an e-mail, browse a web page, and access streaming media.

The audio output unit 103 may convert audio data received by the radio frequency unit 101 or the network module 102 or stored in the memory 109 into an audio signal, and output the audio signal as sound. In addition, the audio output unit 103 may further provide audio output (for example, call signal receiving sound or message receiving sound) related to a specific function performed by the terminal device 100. The audio output unit 103 includes a speaker, a buzzer, a telephone receiver, and the like.

The input unit 104 is configured to receive an audio signal or a video signal. The input unit 104 may include a Graphics Processing Unit (GPU) 1041 and a microphone 1042. The graphics processing unit 1041 processes image data of a static picture or a video obtained by an image capture apparatus (for example, a camera) in video capture mode or image capture mode. A processed image frame may be displayed on the display unit 106. The image frame processed by the graphics processing unit 1041 may be stored in the memory 109 (or another storage medium) or sent via the radio frequency unit 101 or the network module 102. The microphone 1042 may receive a sound and can process such sound into audio data. Processed audio data may be converted, in a call mode, into a format that can be sent to a mobile communication base station by using the radio frequency unit 101 for output.

The terminal device 100 further includes at least one sensor 105, such as an optical sensor, a motion sensor, and other sensors. The light sensor includes an ambient light sensor and a proximity sensor. The ambient light sensor may adjust the luminance of the display panel 1061 based on the brightness of ambient light. The proximity sensor may turn off the display panel 1061 and/or backlight when the terminal device 100 is moved to an ear. As a type of the motion sensor, an accelerometer sensor can detect an acceleration in each direction (generally, three axes), and detect a value and a direction of gravity when the accelerometer sensor is static, and may be configured to recognize a terminal device posture (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, and an infrared sensor. Details are not described herein.

The display unit 106 is configured to display information input by a user or information provided for a user. The display unit 106 may include a display panel 1061. The display panel 1061 may be configured in a form of a Liquid Crystal Display (LCD), an Organic Light-Emitting Diode (OLED), or the like.

The user input unit 107 may be configured to receive input numeral or character information, and generate key signal input related to user setting and function control of the terminal device 100. The user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 110, and receives and executes a command sent by the processor 110. In addition, the touch panel 1071 may be implemented by using a plurality of types such as a resistive type, a capacitive type, an infrared ray, and a surface acoustic wave. The user input unit 107 may include other input devices 1072 in addition to the touch panel 1071. The another input device 1072 may include but is not limited to: a physical keyboard, a function button (such as a volume control button, a switch button), a trackball, a mouse, and a joystick, which is not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. In FIG. 6, the touch panel 1071 and the display panel 1061 are used as two independent components to implement input and output functions of the terminal device 100. However, in some embodiments, the touch panel 1071 and the display panel 1061 may be integrated to implement the input and output functions of the terminal device 100. This is not specifically limited herein.

The interface unit 108 is an interface for connecting an external apparatus to the terminal device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to receive input (for example, data information and power) from an external apparatus and transmit the received input to one or more elements in the terminal device 100 or may be configured to transmit data between the terminal device 100 and the external apparatus.

The memory 109 may be configured to store a software program and various data. The memory 109 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 109 may include a high-speed random access memory, and may further include a nonvolatile memory, for example, at least one magnetic disk storage device, a flash storage device, or another volatile solid-state storage device.

The processor 110 is a control center of the terminal device 100, uses various interfaces and circuits to connect each part of the whole terminal device 100, and performs various functions and processing data of the terminal device 100 by operating or executing a software program and/or module in the memory 109 and calling data stored in the memory 109, so as to integrally monitor the terminal device 100. The processor 110 may include one or more processing units. An application processor and a modem processor may be integrated into the processor 110. The application processor mainly processes an operating system, a user interface, an application program, and the like. The modem processor mainly processes wireless communications. It can be understood that the modem processor may not be integrated into the processor 110.

The terminal device 100 may further include the power supply 111 (such as a battery) supplying power to each component. The power supply 111 may be logically connected to the processor 110 by using a power management system, so as to implement functions such as charging management, discharging management and power consumption management by using the power management system.

In addition, the terminal device 100 includes some function modules not shown. Details are not described herein.

An embodiment of the present disclosure further provides UE. The UE is first UE and includes a processor, a memory, and a computer program stored in the memory and executable on the processor. When the computer program is executed by the processor, the process of the information reporting method shown in the foregoing embodiments is implemented, and a same technical effect can be achieved. To avoid repetition, details are not described herein.

Figure 7:
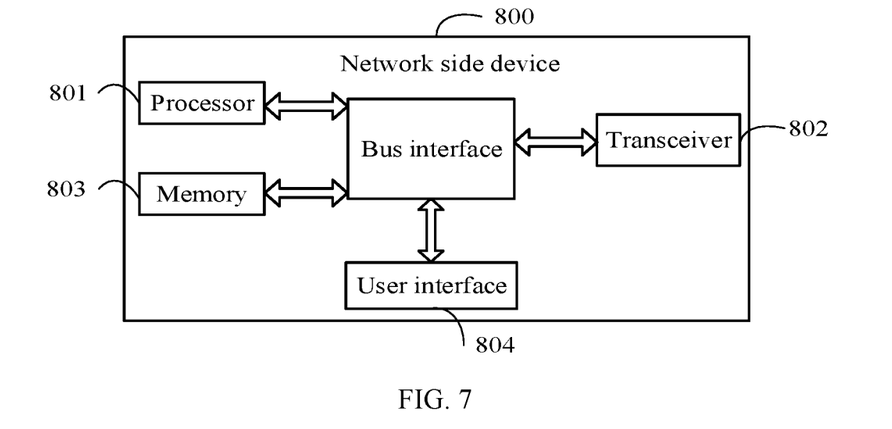
FIG. 7 is a schematic structural diagram 2 of a network side device according to an embodiment of the present disclosure.

FIG. 7 is a schematic diagram of a hardware structure of a network side device for implementing the embodiments of the present disclosure. The network side device 800 includes a processor 801, a transceiver 802, a memory 803, a user interface 804, and a bus interface.

The transceiver 802 is configured to send indication information to first UE, where the indication information is used to instruct the first UE to report target discontinuous transmission or reception information of at least one carrier to the network side device; the target discontinuous transmission or reception information is used to indicate a target discontinuous transmission or reception mode of second UE; the target discontinuous transmission or reception mode includes at least one of the following: a first Uu interface discontinuous transmission or reception mode, a second Uu discontinuous transmission or reception mode, and a sidelink discontinuous transmission or reception mode, where the second Uu discontinuous transmission or reception mode is a Uu discontinuous transmission or reception mode used by UE with a first sidelink resource allocation mode.

According to the network side device provided in the embodiments of the present disclosure, the network side device sends indication information to the first UE, so as to instruct the first UE to report the target discontinuous transmission or reception information of the at least one carrier to the target device, so that the target device may learn the discontinuous transmission or reception information of the first UE of the target discontinuous transmission or reception mode (including at least one of the following: a first Uu discontinuous transmission or reception mode, a second Uu discontinuous transmission or reception mode, and a sidelink discontinuous transmission or reception mode). Further, the target device may learn a discontinuous transmission state (an active state or an inactive state) of the second UE. In this way, it is ensured that the target device has a consistent understanding with the second UE, so that appropriate sidelink resources can be allocated to the second UE, and reliability of a sidelink service is improved.

In this embodiment of the present disclosure, in FIG. 7, a bus architecture may include any quantity of interconnected buses and bridges, and is linked by various circuits of one or more processors represented by the processor 801 and a memory represented by the memory 803. The bus architecture may further link various other circuits such as a peripheral device, a voltage regulator, and a power management circuit together. These are all well-known in the art, and therefore are not further described in this specification. The bus interface provides interfaces. The transceiver 802 may be a plurality of elements, in other words, includes a transmitter and a receiver, and provides a unit configured to communicate with various other apparatuses on a transmission medium. For different user equipment, the user interface 804 may be further an interface capable of connecting externally and internally a required device. The connected device includes but is not limited to a keypad, a display, a speaker, a microphone, a joystick, and the like. The processor 801 is responsible for managing the bus architecture and common processing, and the memory 803 may store data used when the processor 801 performs an operation.

In addition, the network side device 800 further includes some function modules not shown, and details are not described herein.

An embodiment of the present disclosure further provides a network side device, including a processor, a memory, and a computer program that is stored in the memory and that can run on the processor. When the computer program is executed by the processor, the process of the information reporting method shown in the foregoing embodiments is implemented, and a same technical effect can be achieved. To avoid repetition, details are not described herein.

An embodiment of the present disclosure further provides a computer-readable storage medium. A computer program is stored in the computer-readable storage medium, and when the computer program is executed by a processor, a plurality of processes of the information reporting method shown in the foregoing embodiments are implemented, and same technical effects can be achieved. To avoid repetition, details are not described herein. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the method described in the plurality of embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A method for information reporting, performed by a first user equipment (UE), comprising:
reporting target discontinuous transmission or reception information of at least one carrier to a network side device when a predetermined condition is satisfied;
wherein the predetermined condition comprises the first UE selecting a discontinuous transmission or reception configuration, the target discontinuous transmission or reception information is used to indicate a target discontinuous transmission or reception mode that is accepted by the first UE and received from a second UE, and the target discontinuous transmission or reception mode comprises a sidelink discontinuous transmission or reception mode.

2. The method according to claim 1, wherein;
the target discontinuous transmission or reception information is used to indicate: configuration information of the target discontinuous transmission or sk reception mode.

3. The method according to claim 2, wherein the configuration information of the target discontinuous transmission or reception mode comprises at least one of the following: information about a discontinuous transmission cycle of the target discontinuous transmission or reception mode, information about a timer of the target discontinuous transmission or reception mode, offset information of the discontinuous transmission cycle, activation information corresponding to an active time of the target discontinuous transmission or reception mode, or non-active information corresponding to a non-active time of the target discontinuous transmission or reception mode.

4. The method according to claim 1, wherein the predetermined condition further comprises at least one of the following:

the network side device instructs a target UE to report discontinuous transmission or reception information;
the target UE is preconfigured to report the discontinuous transmission or reception information;
a third UE or other UE instructs the target UE to report the discontinuous transmission or reception information;
a protocol provides that the target UE reports the discontinuous transmission or reception information;
the target UE enters an active time;
the target UE enters a non-active time;
a timer of the target discontinuous transmission or reception mode used or activated by the target UE is running;
the timer of the target discontinuous transmission or reception mode expires;
the target UE starts or restarts the timer of the target discontinuous transmission or reception mode;
the target UE receives first sidelink control information (SCI);
the target UE receives first downlink control information (DCI);
a number of transmissions or receptions of the target UE reaches a first threshold;
a number of failure transmissions or receptions of the target UE reaches a second threshold;
a number of discontinuous transmissions or receptions of the target UE reaches a third threshold;
a number of negative acknowledgment (NACK) received by the target UE reaches a fourth threshold;
the target UE performs transmission or reception on a sidelink grant;
the target UE is preempted of a resource;
the target UE preempts a resource;
the target UE enables or disables a sidelink feedback; or
the target UE enables or disables a sidelink feedback report,
wherein the target UE comprises at least one of the following: the second UE or the first UE; the first DCI indicates activation of a sidelink resource or deactivation of a sidelink resource, or a resource indicated by the first DCI comprises at least a resource used for initial transmission; and the resource indicated by the first SCI comprises at least a resource used for initial transmission.

5. The method according to claim 1, wherein:
when a target UE uses a target transmission resource, or regardless of whether the target UE uses the target transmission resource, an operating state of the target UE remains unchanged;
when the target UE uses a target transmission resource, or regardless of whether the target UE uses the target transmission resource, the target UE is at an active time on the target transmission resource; or
when the target UE uses a target transmission resource, or regardless of whether the target UE uses the target transmission resource, starting or restarting a wait-for-retransmission timer of the target discontinuous transmission or reception mode,
wherein the target transmission resource is at least one transmission resource of a sidelink grant; and the target UE comprises at least one of the following: the second UE or the first UE.

6. The method according to claim 1, wherein the target discontinuous transmission or reception information comprises configuration information of a discontinuous transmission or reception mode supported by the second UE.

7. A method for information reporting, performed by a network side device, comprising:
sending indication information to a first user equipment (UE),
wherein the indication information is used to instruct the first UE to report target discontinuous transmission or reception information of at least one carrier to the network side device when a predetermined condition is satisfied, the predetermined condition comprises the first UE selecting a discontinuous transmission of reception configuration, the target discontinuous transmission or reception information is used to indicate a target discontinuous transmission or reception mode that is accepted by the first UE and received from a second UE, and the target discontinuous transmission or reception mode comprises a sidelink discontinuous transmission of reception mode.

8. A user equipment (UE), wherein the UE is a first UE, comprising: a memory storing a computer program; and a processor coupled to the memory and configured to execute the computer program to perform a method for information reporting, the method comprising:
reporting target discontinuous transmission or reception information of at least one carrier to network side device when a predetermined condition is satisfied,
wherein the predetermined condition comprises the first UE selecting a discontinuous transmission or reception configuration, the target discontinuous transmission or reception information is used to indicate a target discontinuous transmission or reception mode that is accepted by first UE and received from a second UE, and the target discontinuous transmission or reception mode comprises a sidelink discontinuous transmission or reception mode.

9. The UE according to claim 8, wherein:
the target discontinuous transmission or reception information is used to indicate configuration information of the target discontinuous transmission or reception mode.

10. The UE according to claim 9, wherein the configuration information of the target discontinuous transmission or reception mode comprises at least one of the following: information about a discontinuous transmission cycle of the target discontinuous transmission or reception mode, information about a timer of the target discontinuous transmission or reception mode, offset information of the discontinuous transmission cycle, activation information corresponding to an active time of the target discontinuous transmission or reception mode, or non-active information corresponding to a non-active time of the target discontinuous transmission or reception mode.

11. The UE according to claim 8, wherein the reporting target discontinuous transmission or reception information of at least one carrier to a network side device comprises:
reporting target discontinuous transmission or reception information of at least one carrier to the network side device based on a device type of the first UE or the second UE.

12. The UE according to claim 8, wherein the predetermined condition further comprises at least one of the following:
the network side device instructs a target UE to report discontinuous transmission or reception information;
the target UE is preconfigured to report the discontinuous transmission or reception information;
a third UE or other UE instructs the target UE to report the discontinuous transmission or reception information;
a protocol provides that the target UE reports the discontinuous transmission of reception information;

the target UE enters an active time;
the target UE enters a non-active time;
a timer of the target discontinuous transmission or reception mode used or activated by the target UE is running;
the timer of the target discontinuous transmission or reception mode expires;
the target UE starts or restarts the timer of the target discontinuous transmission of reception mode;
the target UE receives first sidelink control information (SCI);
the target UE receives first downlink control information (DCI);
a number of transmissions or receptions of the target UE reaches a first threshold;
a number of failure transmissions or receptions of the target UE reaches a second threshold;
a number of discontinuous transmissions or receptions of the target UE reaches a third threshold;
a number of negative acknowledgment (NACK) received by the target UE reaches a fourth threshold;
the target UE performs transmission or reception on a sidelink grant;
the target UE is preempted of a resource;
the target UE preempts a resource;
the target UE enables or disables a sidelink feedback; or
the target UE enables or disables a sidelink feedback report,
wherein the target UE comprises at least one of the following: the second UE or the first UE; the first DCI indicates activation of a sidelink resource or deactivation of a sidelink resource, or a resource indicated by the first DCI comprises at least a resource used for initial transmission; and the resource indicated by the first SCI comprises at least a resource used for initial transmission.

13. The UE according to claim 8, wherein:
when a target UE uses a target transmission resource, or regardless of whether the target UE uses the target transmission resource, an operating state of the target UE remains unchanged;
when the target UE uses a target transmission resource, or regardless of whether the target UE uses the target transmission resource, the target UE is at an active time on the target transmission resource; or
when the target UE uses a target transmission resource, or regardless of whether the target UE uses the target transmission resource, starting or restarting a wait-for-retransmission timer of the target discontinuous transmission or reception mode,
wherein the target transmission resource is at least one transmission resource of a sidelink grant; and the target UE comprises at least one of the following: the second UE or the first UE.

14. The UE according to claim 8, wherein the target discontinuous transmission or reception information comprises configuration information of a discontinuous transmission or reception mode supported by the second UE.

15. A network side device, comprising: a memory storing a computer program; and a processor coupled to the memory and configured to execute the computer program to perform operations comprising:
sending indication information to a first user equipment (UE),
wherein the indication information is used to instruct the first UE to report target discontinuous transmission or reception information of at least one carrier to the network side device when a predetermined condition is satisfied, the predetermined condition comprises the first UE selecting a discontinuous transmission or reception configuration the target discontinuous transmission or reception information is used to indicate a target discontinuous transmission or reception mode that is accepted by the first UE and received from a second UE, and the target discontinuous transmission or reception mode comprises a sidelink discontinuous transmission or reception mode.

16. The method according to claim 7, wherein the target discontinuous transmission or reception information is used to indicate configuration information of the target discontinuous transmission or reception mode.

17. The method according to claim 16, wherein the configuration information of the target discontinuous transmission or reception mode comprises at least one of the following: information about a discontinuous transmission cycle of the target discontinuous transmission or reception mode, information about a timer of the target discontinuous transmission or reception mode, offset information of the discontinuous transmission cycle, activation information corresponding to an active time of the target discontinuous transmission or reception mode, or non-active information corresponding to a non-active time of the target discontinuous transmission or reception mode.

18. The network side device according to claim 15, wherein the target discontinuous transmission or reception information is used to indicate configuration information of the target discontinuous transmission or reception mode.

19. The network side device according to claim 18, wherein the configuration information of the target discontinuous transmission or reception mode comprises at least one of the following: information about a discontinuous transmission cycle of the target discontinuous transmission or reception mode, information about a timer of the target discontinuous transmission or reception mode, offset information of the discontinuous transmission cycle, activation information corresponding to an active time of the target discontinuous transmission or reception mode, or non-active information corresponding to a non-active time of the target discontinuous transmission or reception mode.

* * * * *